(12) United States Patent
Kwon et al.

(10) Patent No.: US 10,024,356 B2
(45) Date of Patent: Jul. 17, 2018

(54) TGS CABLE SOCKET INCLUDING RUBBER DAMPER AND METHOD OF MANUFACTURING THE SAME

(71) Applicants: Hyundai Motor Company, Seoul (KR); Kia Motors Corporation, Seoul (KR); Kyung Chang Industrial Co., Ltd., Daegu (KR)

(72) Inventors: Min-Keun Kwon, Bucheon-si (KR); Myung-Lyul Na, Hwaseong-si (KR); Yong-Hee Kim, Seoul (KR); Ean-Soo Cho, Hwaseong-si (KR); Kyu-Jung Kim, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 15/347,635

(22) Filed: Nov. 9, 2016

(65) Prior Publication Data
US 2017/0198743 A1 Jul. 13, 2017

(30) Foreign Application Priority Data
Jan. 7, 2016 (KR) .................. 10-2016-0001901

(51) Int. Cl.
*F16C 1/10* (2006.01)
(52) U.S. Cl.
CPC .............. *F16C 1/108* (2013.01); *F16C 1/101* (2013.01)
(58) Field of Classification Search
CPC .. F16C 1/10; F16C 1/101; F16C 1/108; F16C 1/26; F16C 1/265; F16C 1/102; F16C 1/14
See application file for complete search history.

(56) References Cited

U.S. PATENT DOCUMENTS

| 5,383,377 A * | 1/1995 | Boike ................... F16C 1/103 |
| | | 74/502 |
| 9,638,238 B2 * | 5/2017 | Aoki ...................... F16C 1/145 |
| 2012/0267507 A1 | 10/2012 | Norris |

FOREIGN PATENT DOCUMENTS

| JP | 2011-133020 A | 7/2011 |
| KR | 10-2005-0074937 A | 7/2005 |
| KR | 10-2008-0045949 A | 5/2008 |
| KR | 10-2011-0085173 A | 7/2011 |
| KR | 10-1201254 B1 | 11/2012 |
| KR | 10-2013-0043496 A | 4/2013 |
| KR | 10-1295009 B1 | 8/2013 |

(Continued)

*Primary Examiner* — Thomas C Diaz
(74) *Attorney, Agent, or Firm* — Morgan, Lewis & Bockius LLP

(57) ABSTRACT

A Transmission Gear Shift (TGS) cable socket including a rubber damper to couple a TGS lever and an outer cable to each other so a manipulation force of the TGS lever is transmitted to a transmission through an inner cable disposed in the outer cable, may include the rubber damper to damp vibration transmitted from the outer cable, a steel cup disposed coaxially with the rubber damper, the steel cup having a first end disposed in the rubber damper, and a second end protruding from the rubber damper and coupled to the outer cable, and a guide pipe disposed coaxially with the rubber damper, the guide pipe including a first end disposed in the rubber damper at a position spaced apart from the steel cup, and a second end protruding from the rubber damper.

15 Claims, 13 Drawing Sheets

(56) References Cited

FOREIGN PATENT DOCUMENTS

| KR | 10-1300690 B1 | 8/2013 |
| KR | 10-2014-0034422 A | 3/2014 |
| KR | 10-1462924 B1 | 11/2014 |
| KR | 10-1470193 B1 | 12/2014 |
| KR | 10-1517799 B1 | 5/2015 |

* cited by examiner

TGS CABLE SOCKET INCLUDING RUBBER DAMPER AND METHOD OF MANUFACTURING THE SAME

CROSS-REFERENCE TO RELATED APPLICATIONS

The present application claims priority to Korean Patent Application No. 10-2016-0001901, filed Jan. 7, 2016, the entire contents of which is incorporated herein for all purposes by this reference.

BACKGROUND OF THE INVENTION

Field of the Invention

Various embodiments of the present invention relate to a Transmission Gear Shift (TGS) cable socket including a rubber damper and a method of manufacturing the same and, particularly, to a TGS cable socket including a rubber damper which is configured without a mass damper, thus reducing the production cost, and which is capable of enhancing the performance of manipulating a TGS lever, and a method of manufacturing the TGS cable socket.

Description of Related Art

Generally, a TGS cable (including outer and inner cables) is provided between a transmission and a gear shifting apparatus provided with a TGS lever for a vehicle so that manipulation force of the TGS lever can be transmitted to the transmission by the TGS cable. The conventional TGS cable is installed such that one end thereof is coupled to the TGS lever of the gear shifting apparatus while the other end thereof is coupled to a gear shift manipulation device of the transmission.

When a driver manipulates the TGS lever having the above-mentioned configuration, the manipulation force of the driver is transmitted to the gear shift manipulation device through the TGS cable so that gear shifting can be implemented. In this regard, a mass damper is provided on the TGS cable so as to mitigate vibration, noise or the like transmitted from the transmission during the gear shifting.

However, the conventional TGS cable is problematic in that the production cost is increased by the use of the separate mass damper.

Furthermore, because the mass damper is installed on the TGS cable, the manipulation performance is reduced during the gear shifting.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a TGS cable socket including a rubber damper which has a structure capable of mitigating vibration, noise or the like transmitted from a transmission even without using a separate mass damper, and a method of manufacturing the same.

According to various aspects of the present invention, a Transmission Gear Shift (TGS) cable socket including a rubber damper configured to couple a TGS lever and an outer cable to each other so a manipulation force of the TGS lever is transmitted to a transmission through an inner cable disposed in the outer cable, may include the rubber damper configured to damp vibration transmitted from the outer cable, a steel cup disposed coaxially with the rubber damper, the steel cup having a first end disposed in the rubber damper, and a second end protruding from the rubber damper and coupled to the outer cable, and a guide pipe disposed coaxially with the rubber damper, the guide pipe including a first end disposed in the rubber damper at a position spaced apart from the steel cup, and a second end protruding from the rubber damper.

The rubber damper may include a cylindrical rubber damper body, a fixing part protruding from an outer circumferential surface of the rubber damper body, and a plurality of insulation protrusions disposed on the outer circumferential surface of the rubber damper body on opposite sides of the fixing part and protruding from a central axis of the rubber damper body in a radial direction.

A height of each of the insulation protrusions from the outer circumferential surface of the rubber damper body with respect to the radial direction of the rubber damper body may be less than a height of the fixing part from the outer circumferential surface of the rubber damper body with respect to the radial direction of the rubber damper body.

The steel cup may include a cylindrical steel cup body inserted at a first end thereof into the rubber damper body, and a steel cup coupling part protruding from the first end of the steel cup body toward the rubber damper body and configured to fix the steel cup body to the rubber damper body.

The steel cup coupling part may include a plurality of steel cup coupling holes formed parallel to the steel cup body.

The guide pipe may include a guide pipe body inserted at a first end thereof into a rubber damper body, and a guide pipe head protruding from the first end of the guide pipe body and inserted into the rubber damper body.

The TGS cable socket including the rubber damper may further include a damper pipe disposed such that an inner circumferential surface thereof comes into close contact with an outer circumferential surface of the fixing part, the damper pipe being configured to fix the rubber damper in the TGS cable socket at a predetermined position.

The damper pipe may include a plurality of first guide parts protruding from an outer circumferential surface of the damper pipe and extending parallel to a central axis of the damper pipe, and a plurality of second guide parts protruding from the inner circumferential surface of the damper pipe, each of the second guide parts having a through hole formed parallel to the central axis of the damper pipe.

The TGS cable socket including the rubber damper may further include a socket body in which the damper pipe is seated.

The socket body may include a disc-shaped blocking member having a first surface with which one end of the rubber damper comes into contact, and a through hole formed coaxially with the rubber damper, a first cylindrical member formed on a first side of the blocking member and disposed coaxially with the rubber damper, the first cylindrical member having an inner circumferential surface coming into contact with an outer circumferential surface of the damper pipe, and a second cylindrical member formed on a second side of the blocking member and disposed coaxially with the first cylindrical member.

The socket body may further include a plurality of socket body protrusions protruding from the first surface of the blocking member into the first cylindrical member and coming into contact with one surface of the fixing part.

The socket body protrusions may be inserted into space between the insulation protrusions, and each of the socket body protrusions may have a fan-shaped cross-section.

The first cylindrical member may include a plurality of guide grooves, formed in the inner circumferential surface of the first cylindrical member and extending parallel to a central axis of the first cylindrical member, and into which guide parts are inserted, and a plurality of coupling parts protruding from an outer circumferential surface of the first cylindrical member.

The TGS cable socket including the rubber damper may further include a body stopper, which is coupled to the first cylindrical member, and into which the rubber damper, the steel cup, a damper pipe and a first cylindrical member may be inserted.

The body stopper may include a cylindrical stopper body having an inner circumferential surface coming into contact with an outer circumferential surface of the first cylindrical member, a body stopper side surface coming into contact with a side surface of the first cylindrical member and including a through hole, through which a steel cup body passes, a plurality of coupling holes formed in an outer circumferential surface of the stopper body so that coupling parts are inserted into the coupling holes, a stopper support protruding from an upper portion of the stopper body and supporting the stopper, and a plurality of body stopper protrusions protruding from the body stopper side surface into the stopper body and coming into contact with one surface of the fixing part.

The TGS cable socket including the rubber damper may further include a cap into which a second cylindrical member is inserted, and including one end coming into contact with a blocking member.

The TGS cable socket including the rubber damper may further include a stopper having a first end hinged to an upper portion of the cap, and a second end supported by a stopper support.

The TGS cable socket including the rubber damper may further include a spring disposed between the cap and a second cylindrical member and having a first end coming into contact with a blocking member.

The TGS cable socket may further include a spring holder disposed coaxially with the cap and inserted into the cap, the spring holder coming into contact with a second end of the spring.

According to various aspects of the present invention, a method of manufacturing a Transmission Gear Shift (TGS) cable socket including a rubber damper, may include disposing a steel cup in a damper pipe and inserting a mold for the rubber damper into opposite ends of the damper pipe, forming the rubber damper by injection molding;

separating the mold from the damper pipe and inserting the damper pipe into a socket body, coupling a body stopper to a first side of the socket body, coupling a cap hinged with the stopper to a second side of the socket body, interposing a spring between the socket body and the cap, and coupling a spring holder to the cap, and inserting a head of the guide pipe into the rubber damper.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
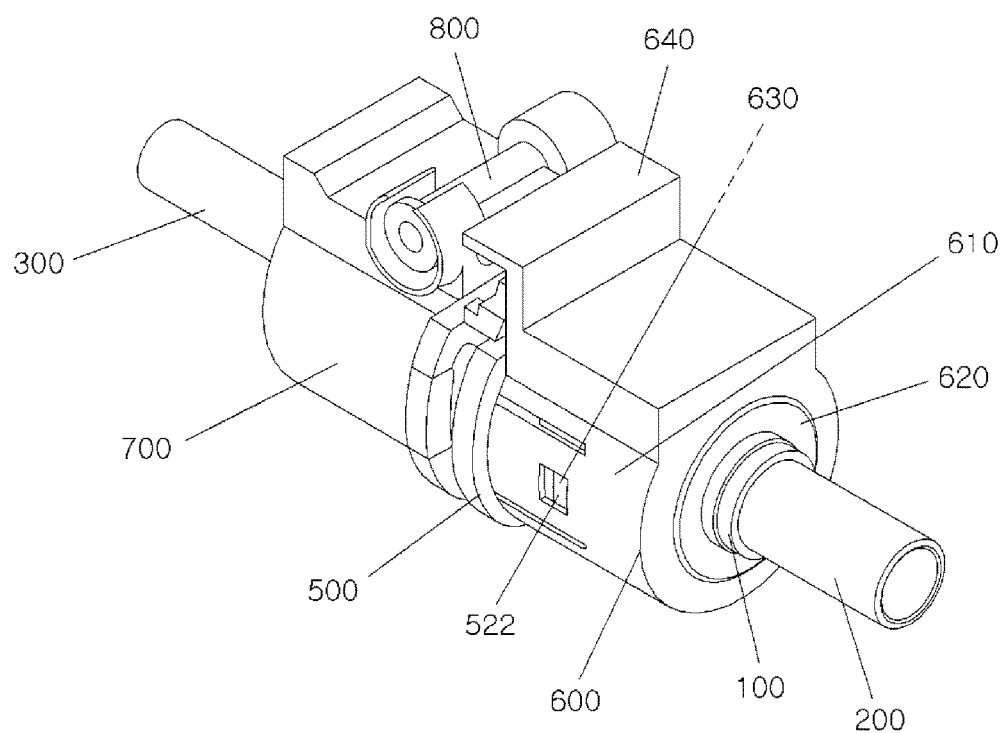
FIG. 1 is a perspective view illustrating a TGS cable socket including a rubber damper according to various embodiments of the present invention.
Figure 2:
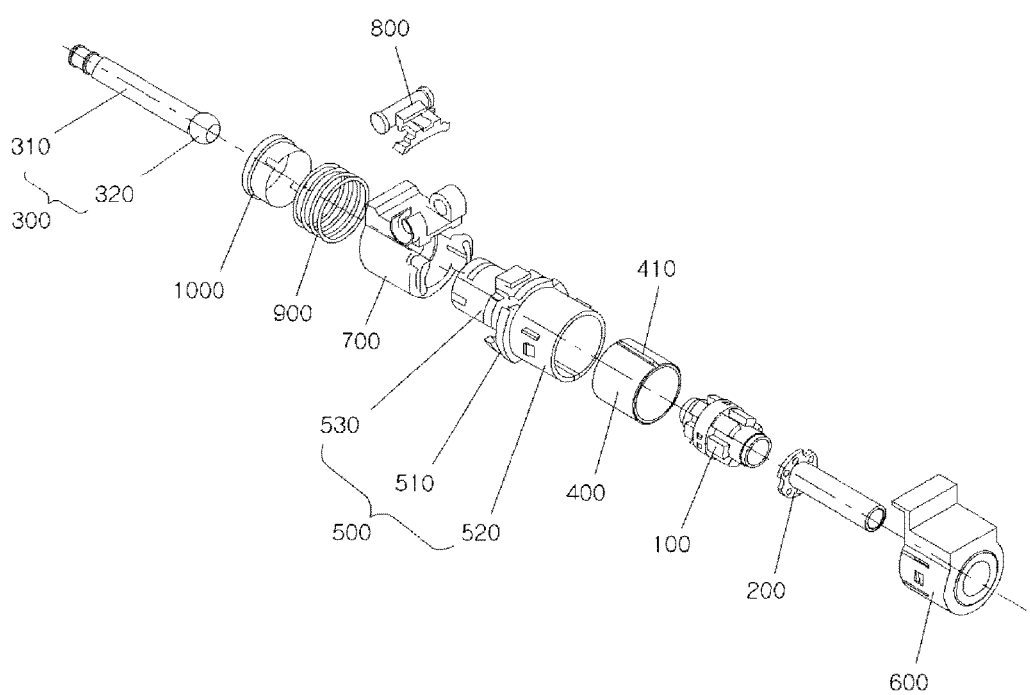
FIG. 2 is an exploded perspective view illustrating the TGS cable socket including the rubber damper according to various embodiments of the present invention.

FIG. 1 is a perspective view illustrating a TGS cable socket including a rubber damper according to various embodiments of the present invention, and FIG. 2 is an exploded perspective view illustrating the TGS cable socket including the rubber damper according to various embodiments of the present invention. Referring to FIGS. 1 and 2, the TGS cable socket according to various embodiments of the present invention functions to couple a Transmission Gear Shift (TGS) lever and an outer cable with each other and transmit manipulation force of the TGS lever to a transmission through an inner cable disposed in the outer cable. The TGS cable socket includes a rubber damper 100, a steel cup 200 a guide pipe 300, a damper pipe 400, a socket body 500, a body stopper 600, a cap 700, a stopper 800, a spring 900 and a spring holder 1000.

Figure 3:
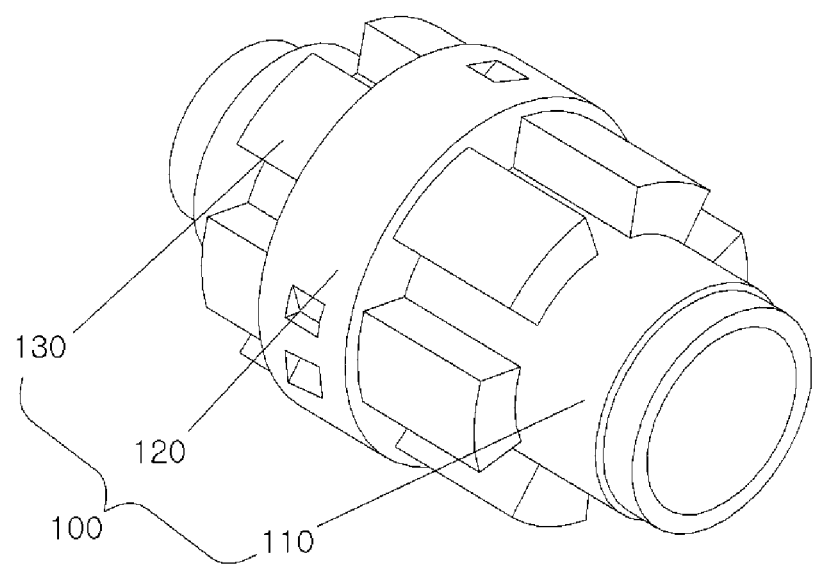
FIG. 3 is a perspective view of the rubber damper according to various embodiments of the present invention.
Figure 4:
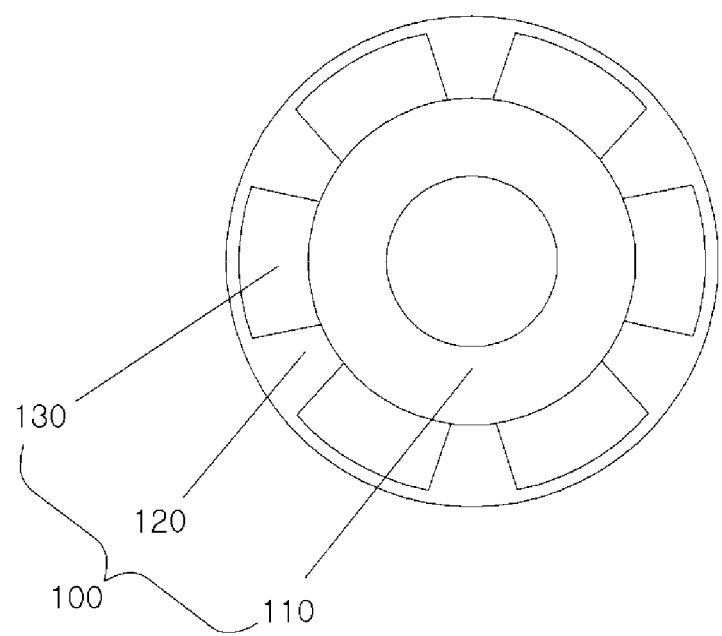
FIG. 4 is a front view of the rubber damper according to various embodiments of the present invention.
Figure 5:
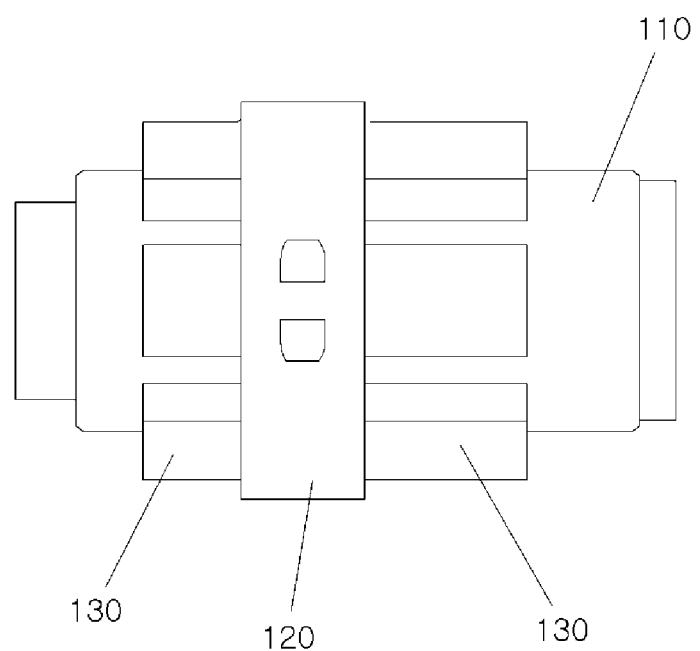
FIG. 5 is a side view of the rubber damper according to various embodiments of the present invention.

The rubber damper 100 functions to damp vibration transmitted from the outer cable. FIG. 3 is a perspective view of the rubber damper according to various embodiments of the present invention, FIG. 4 is a front view of the rubber damper according to various embodiments of the present invention, and FIG. 5 is a side view of the rubber damper according to various embodiments of the present invention. Referring to FIGS. 3 to 5, the rubber damper 100 includes a rubber damper body 110, a fixing part 120 and insulation parts 130.

The rubber damper body 110 has a cylindrical shape. The steel cup 200 and the guide pipe 300 are disposed in the rubber damper body 110. Furthermore, the inner cable is disposed to pass through the steel cup 200 and the guide pipe 300 so that manipulation force input to the TGS lever by a driver is transmitted to the transmission through the inner cable.

The fixing part 120 is formed to protrude from an outer circumferential surface of the rubber damper body 110. The fixing part 120 comes into close contact with an inner circumferential surface of the damper pipe 400, which will be described later herein, and functions to fix the rubber damper 100 in the damper pipe 400.

The insulation parts 130 are disposed on the outer circumferential surface of the rubber damper body 110 on opposite sides of the fixing part 120 and formed to radially protrude from a central axis of the rubber damper body 110. The insulation parts 130 may comprise a plurality of protrusions each of which has a fan-shaped cross-section. However, the cross-sectional shape of the insulation part 130 is not limited to this, and the insulation part 130 may have other cross-sectional shapes so long as they are advantageous to reducing vibration and noise. As described above, because the insulation parts 130 are separately disposed on the opposite sides of the fixing part 120, backlash and durability performance of the rubber damper 100 can be enhanced.

In some embodiments, the height of each insulation part 130 from the outer circumferential surface of the rubber damper body 110 with respect to the radial direction of the rubber damper body 110 is less than the height of the fixing part 120 from the outer circumferential surface of the rubber damper body 110 with respect to the radial direction of the rubber damper body 110. That is, because the insulation parts 130 do not make contact with the inner circumferential surface of the damper pipe 400, vibration, noise or the like transmitted from the transmission to the TGS lever can be mitigated (in other words, the NVH performance can be enhanced).

As will be described later herein, the rubber damper 100 is formed by injection molding. In detail, a rubber damper mold manufactured to form the rubber damper 100 having the above-mentioned configuration is provided. Melted material to form the rubber damper 100 is injected into the rubber damper mold. In this way, the rubber damper 100 is formed.

Figure 6:
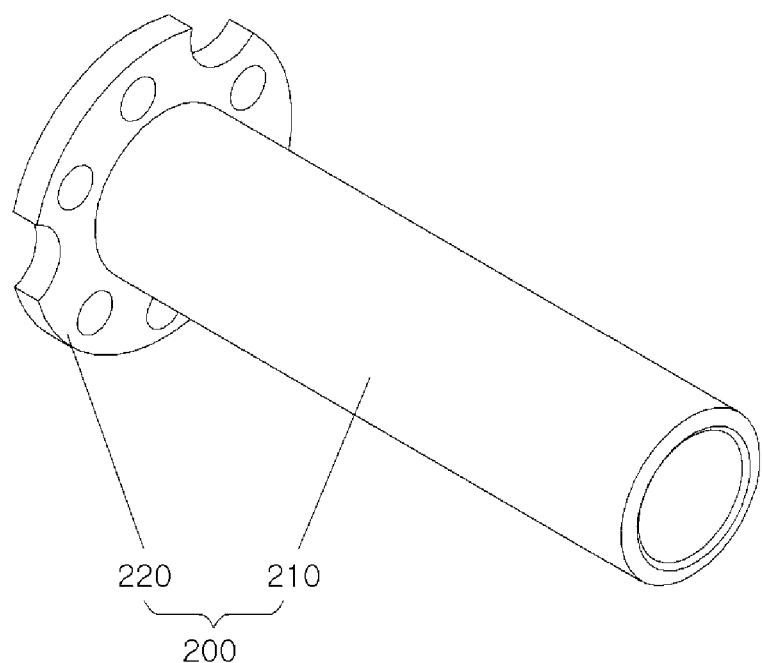
FIG. 6 is a perspective view of a steel cup according to various embodiments of the present invention.
Figure 7:
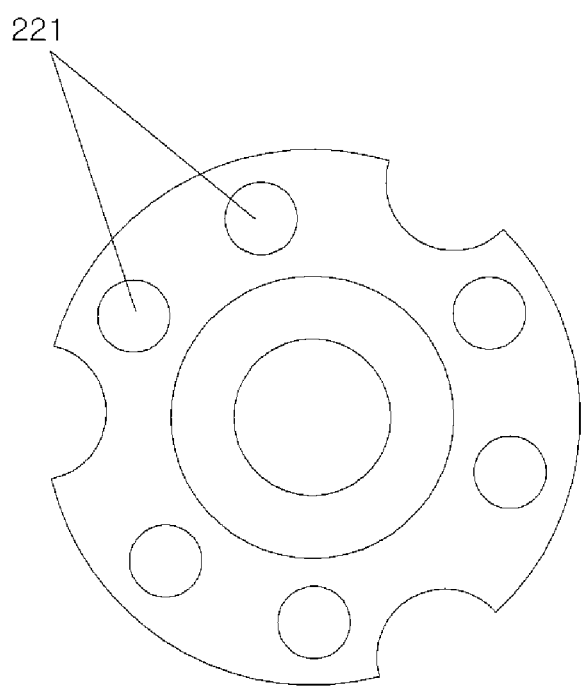
FIG. 7 is a front view of the steel cup according to various embodiments of the present invention.
Figure 8:
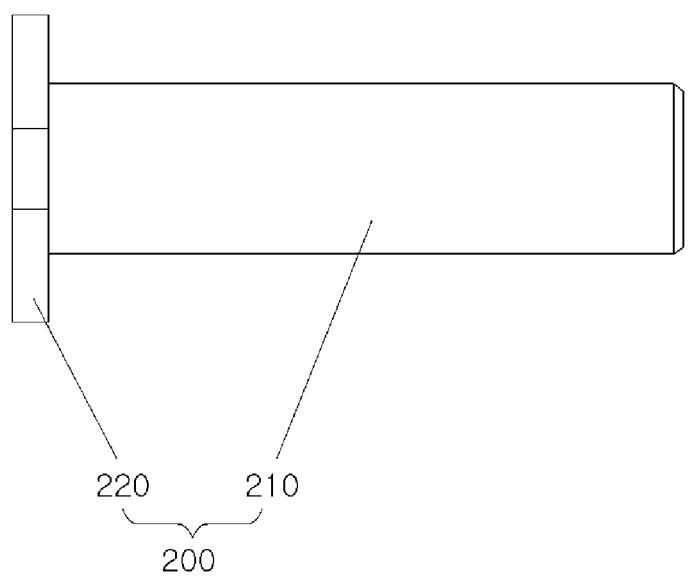
FIG. 8 is a side view of the steel cup according to various embodiments of the present invention.

The steel cup 200 is disposed coaxially with the rubber damper 100. A first end of the steel cup 200 is installed in the rubber damper 100, and a second end thereof protrudes from the rubber damper 100 and is coupled to the outer cable. FIG. 6 is a perspective view of the steel cup according to the present invention, FIG. 7 is a front view of the steel cup according to the present invention, and FIG. 8 is a side view of the steel cup according to the present invention. Referring to FIGS. 6 to 8, the steel cup 200 includes a steel cup body 210 and a steel cup coupling part 220.

The steel cup body 210 is inserted at the first end thereof into the rubber damper body 110 and has a cylindrical shape. The inner cable is disposed to pass through the steel cup 210 so that manipulation force inputted to the TGS lever by the driver can be transmitted to the transmission through the inner cable.

The steel cup coupling part 220 protrudes from the first end of the steel cup body 210 toward the rubber damper body 110 and functions to fix the steel cup body 210 to the rubber damper body 110. In addition, vibration or noise of the TGS cable can be easily absorbed to the rubber damper 100 by the steel cup coupling part 220.

The steel cup coupling part 220 has a plurality of steel cup coupling holes 221 formed parallel to the steel cup body 210. The rubber damper 100 is formed by injection molding. Therefore, portions of the rubber damper 100 are inserted into the steel cup coupling holes 221, whereby the steel cup 200 can be stably fixed to the rubber damper 100.

The guide pipe 300 is disposed coaxially with the rubber damper 100. A first end of the guide pipe 300 is installed in the rubber damper 100 at a position spaced apart from the steel cup 200, and a second end thereof protrudes from the rubber damper 100. The guide pipe 300 includes a guide pipe body 310 and a guide pipe head 320.

The guide pipe body 310 has a cylindrical shape, the first end of which is inserted into the rubber damper body 110. The inner cable is disposed to pass through the guide pipe body 310 so that manipulation force inputted to the TGS lever by the driver can be transmitted to the transmission through the inner cable.

The guide pipe head 320 protrudes from the first end of the guide pipe body 310 and is installed in the rubber damper body 110. In this regard, the mold for the rubber damper 100 has a shape capable of forming, in the rubber damper body 100, a space in which the guide pipe head 320 is installed.

Figure 9:
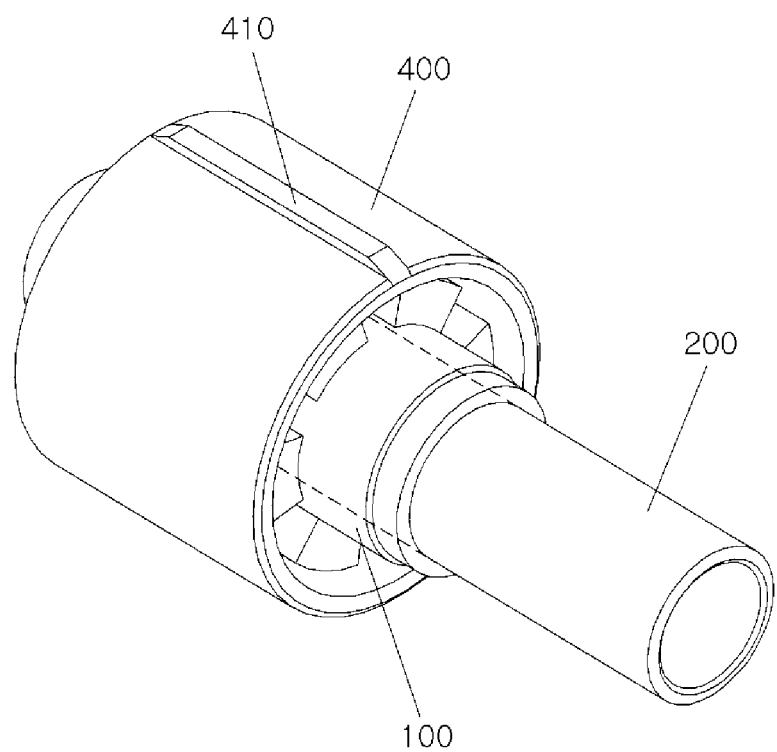
FIG. 9 is a perspective view illustrating an assembly of the rubber damper, the steel cup and a damper pipe according to various embodiments of the present invention.
Figure 10:
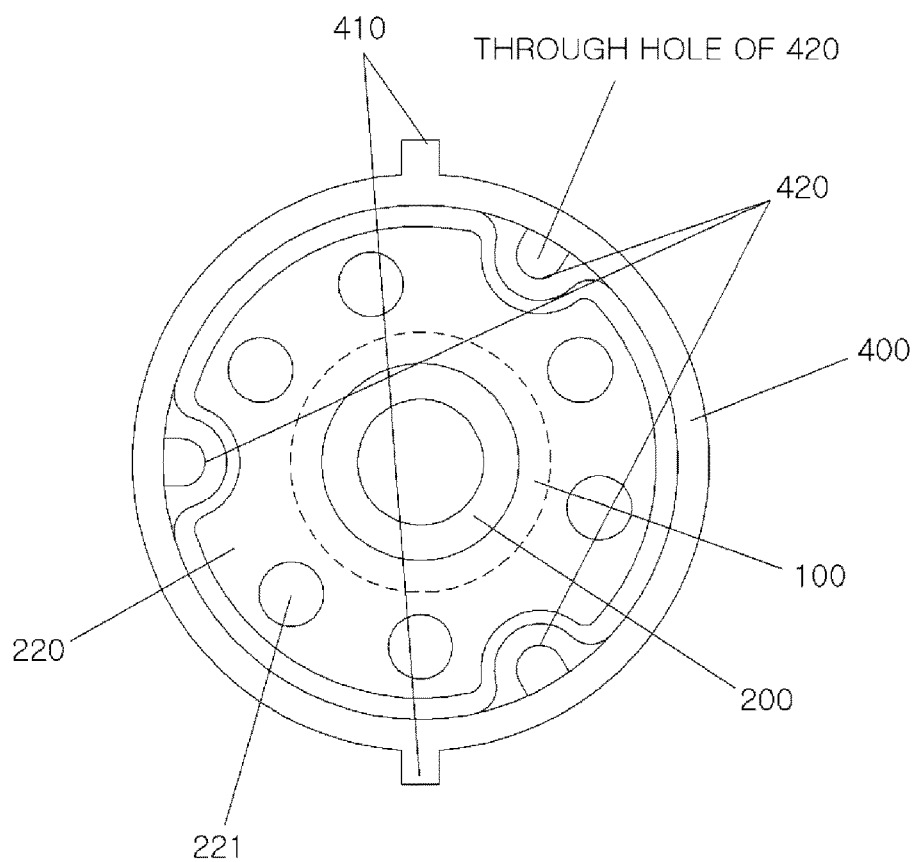
FIG. 10 is a front view illustrating the assembly of the rubber damper, the steel cup and the damper pipe according to various embodiments of the present invention.
Figure 11:
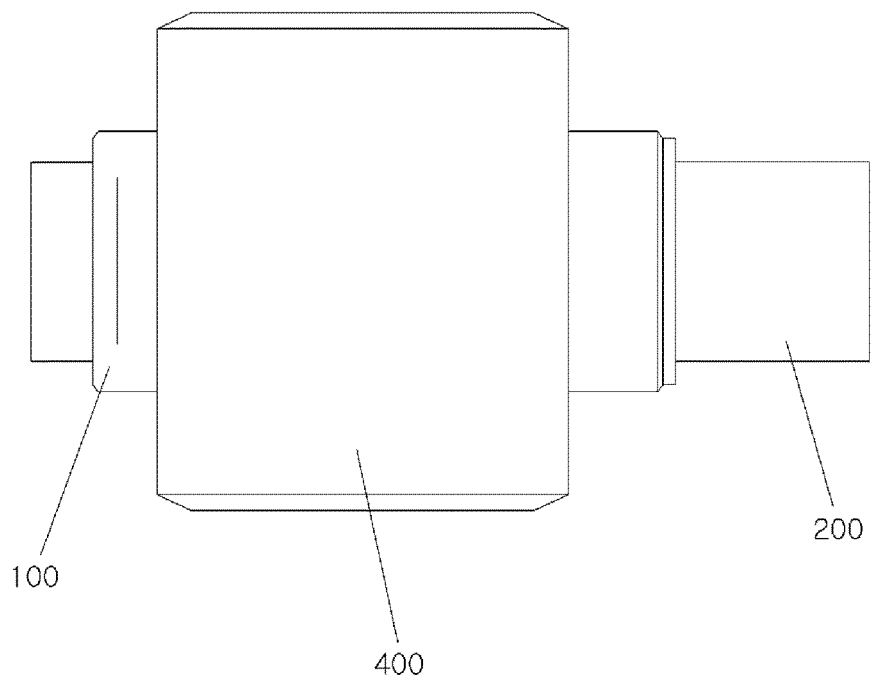
FIG. 11 is a side view illustrating the assembly of the rubber damper, the steel cup and the damper pipe according to various embodiments of the present invention.

The damper pipe 400 is disposed such that the inner circumferential surface of the damper pipe 400 comes into close contact with the outer circumferential surface of the fixing part 120. The damper pipe 400 functions to fix the rubber damper 100 in the TGS cable socket at a predetermined position. FIG. 9 is a perspective view illustrating an assembly of the rubber damper, the steel cup and the damper pipe according to various embodiments of the present invention, FIG. 10 is a front view illustrating the assembly of the rubber damper, the steel cup and the damper pipe according to various embodiments of the present invention, and FIG. 11 is a side view illustrating the assembly of the rubber damper, the steel cup and the damper pipe according to various embodiments of the present invention. Referring to FIGS. 9 to 11, the damper pipe 400 has a cylindrical shape and includes a first guide part 410 and a second guide part 420.

The first guide part 410 protrudes from an outer circumferential surface of the damper pipe 400 and extends parallel to the central axis of the damper pipe 400. A plurality of first guide parts 410 may be provided. The first guide part 410 is inserted into a guide groove 521 of the socket body 500, which is described below, and guides the damper pipe 400 to a position at which the damper pipe 400 is installed in the socket body 500. In this regard, the first guide part 410 is chamfered on front and rear ends thereof so as to facilitate assembly between the damper pipe 400 and the socket body 500.

The second guide part 420 protrudes from an inner circumferential surface of the damper pipe 400 and has a through hole extending parallel to the central axis of the damper pipe 400. A plurality of second guide parts 420 may be provided. As stated above, the rubber damper 100 is formed by injection molding. Therefore, a portion of the rubber damper 100 is instead into the through hole, whereby the rubber damper 100 and the damper pipe 400 can be stably fixed to each other. Thereby, undesirable movement of the rubber damper 100 is mitigated, so the backlash and durability performance of the rubber damper 100 can be enhanced. In this regard, because the through hole is formed in a direction parallel to the central axis of the damper pipe 400, the portion of the rubber damper 100 can be easily inserted into the through hole when the rubber damper 100 is formed by injection molding.

Figure 12:
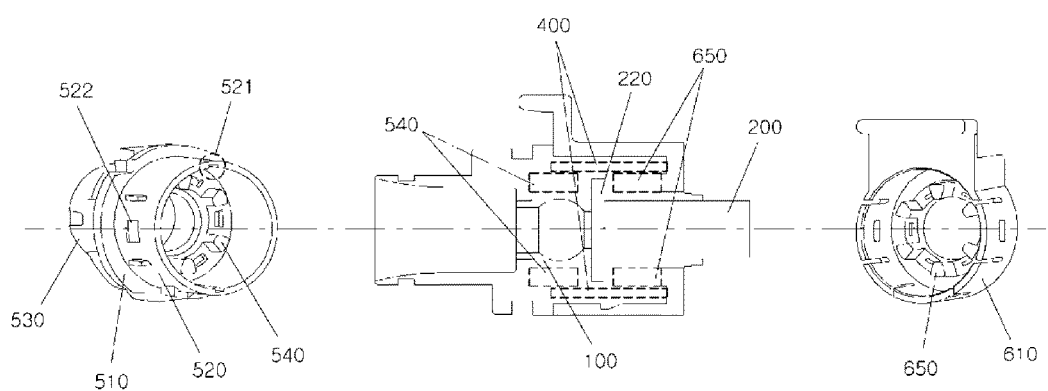
FIG. 12 illustrates an assembled state of an assembly of the rubber damper, the steel cup, the damper pipe, a socket body and a body stopper according to various embodiments of the present invention.

The socket body 500 functions to seat the damper pipe 400 therein. FIG. 12 illustrates an assembled state of an assembly of the rubber damper, the steel cup, the damper pipe, the socket body and a body stopper according to various embodiments of the present invention. Referring to FIG. 12, the socket body 500 includes a blocking member 510, a first cylindrical member 520, a second cylindrical member 530 and a socket body protrusion 540.

The blocking member 510 is formed in the form of a disc, which has a first surface coming into contact with one end of the rubber damper 100, and in which a through hole is formed coaxially with the rubber damper 100. The rubber damper body 110 may pass through the through hole. The guide pipe 300, particularly, the guide pipe head 320, is inserted into the rubber damper body 110 through the through hole.

The first cylindrical member 520 is formed on a first side of the blocking member 510 and is disposed coaxially with the rubber damper 100. An inner circumferential surface of the first cylindrical member 520 comes into contact with the outer circumferential surface of the damper pipe 400. The second cylindrical member 530 is formed on a second side of the blocking member 510 and is disposed coaxially with the first cylindrical member 520. The second cylindrical member 530 is inserted into the cap 700 which will be described later herein.

The socket body protrusion 540 protrudes from the first surface of the blocking member 510 into the first cylindrical member 520 and comes into contact with a first surface of the fixing part 120. A plurality of socket body protrusions 540 may be provided. The socket body protrusions 540 are inserted into space between the insulation parts 130. Furthermore, each of the socket body protrusions 540 may have a fan-shaped cross-section, which is advantageous to blocking vibration and noise of the TGS cable and is capable of enhancing the durability performance.

That is, the socket body protrusions 540 and the insulation parts 130 are alternately arranged to come into contact with each other. In this case, the socket body protrusions 540 also come into contact with the damper pipe 400 and the rubber damper body 100. Thereby, the socket body protrusions 540 reliably support the rubber damper 100 so that vibration and noise transmitted from the TGS cable through the steel cup 200 can be blocked. Furthermore, when the driver manipulates the TGS lever, the socket body protrusions 540 absorb vibrations of the rubber damper 100 and the steel cup 200, thus enhancing the backlash and durability performance of the rubber damper 100.

The first cylindrical member 520 includes a guide groove 521 and a coupling part 522.

The guide groove 521 is formed in the inner circumferential surface of the first cylindrical member 520 and extends parallel to the central axis of the first cylindrical member 520. Furthermore, the guide part 410 is inserted into the guide groove 521 so as to guide the damper pipe 400 to the position at which the damper pipe 400 is installed in the socket body 500. In this regard, a plurality of guide grooves 521 may be provided.

The coupling part 522 is formed to protrude from the outer circumferential surface of the first cylindrical member 520. A plurality of coupling parts 522 may be provided. In detail, the coupling part 522 is inserted into a coupling hole 630 of the body stopper 600, which will be described herein later, so that the socket body 500 and the body stopper 600 can be coupled to each other in a snap-in manner or the like.

The rubber damper 100, the steel cup 200, the damper pipe 400 and the first cylindrical member 520 are inserted into the body stopper 600. The body stopper 600 is coupled with the socket body 500, particularly, the first cylindrical member 520. FIG. 12 illustrates the assembled state of the assembly of the rubber damper, the steel cup, the damper pipe, the socket body and the body stopper according to various embodiments of the present invention. Referring to FIG. 12, the body stopper 600 includes a stopper body 610, a body stopper side surface 620, a coupling hole 630, a stopper support 640 and a body stopper protrusion 650.

The stopper body 610 has a cylindrical shape. An inner circumferential surface of the stopper body 610 and the outer circumferential surface of the first cylindrical member 520 are brought into contact with each other.

The body stopper side surface 620 comes into contact with a side surface of the first cylindrical member 520. Furthermore, a through hole, through which the steel cup body 210 passes, is formed in the body stopper side surface 620.

The coupling hole 630 is formed in an outer circumferential surface of the stopper body 610. A plurality of coupling holes 630 may be provided. The coupling part 522 is inserted into the coupling hole 630 so that the socket body 500 and the body stopper 600 may be coupled to each other in a snap-in manner or the like.

The stopper support 640 protrudes from an upper portion of the stopper body 610 and supports the stopper 800.

The body stopper protrusion 650 protrudes from the body stopper side surface 620 into the stopper body 610. Furthermore, the body stopper protrusion 650 comes into contact with a second surface of the fixing part 120. A plurality of body stopper protrusions 650 may be provided. Each of the body stopper protrusions 650 may have a fan-shaped cross-section, which is advantageous to blocking vibration and noise of the TGS cable and is capable of enhancing the durability performance.

That is, the body stopper protrusions 650 and the insulation parts 130 are alternately arranged to come into contact with each other. In this case, the body stopper protrusions 650 also come into contact with the damper pipe 400 and the rubber damper body 100. Thereby, the body stopper protrusions 650 reliably support the rubber damper 100 so that vibration and noise transmitted from the TGS cable through the steel cup 200 can be blocked. Furthermore, when the driver manipulates the TGS lever, the body stopper protrusions 650 absorb vibrations of the rubber damper 100 and the steel cup 200, thus enhancing the backlash and durability performance of the rubber damper 100.

The TGS cable socket including the rubber damper according to various embodiments of the present invention includes the cap 700, the stopper 800, the spring 900 and the spring holder 1000 (refer to FIG. 2).

The second cylindrical member 530 is inserted into the cap 700, and the blocking member 510 comes into contact with one end of the cap 700. Furthermore, a first end of the stopper 800 is hinged to an upper portion of the cap 700, and a second end of the stopper 800 is supported by the stopper support 620. Thereby, the stopper 800 functions to guide forward or backward movement of the cap 700.

The spring 900 is disposed between the cap 700 and the second cylindrical member 530. A first end of the spring 900 comes into contact with the blocking member 510. The spring holder 1000 is disposed coaxially with the cap 700 and is inserted into and coupled to the cap 700. Thereby, the spring holder 1000 is brought into contact with a second end of the spring 900. The spring holder 1000 functions to support the reaction force of the spring 900.

Figure 13:
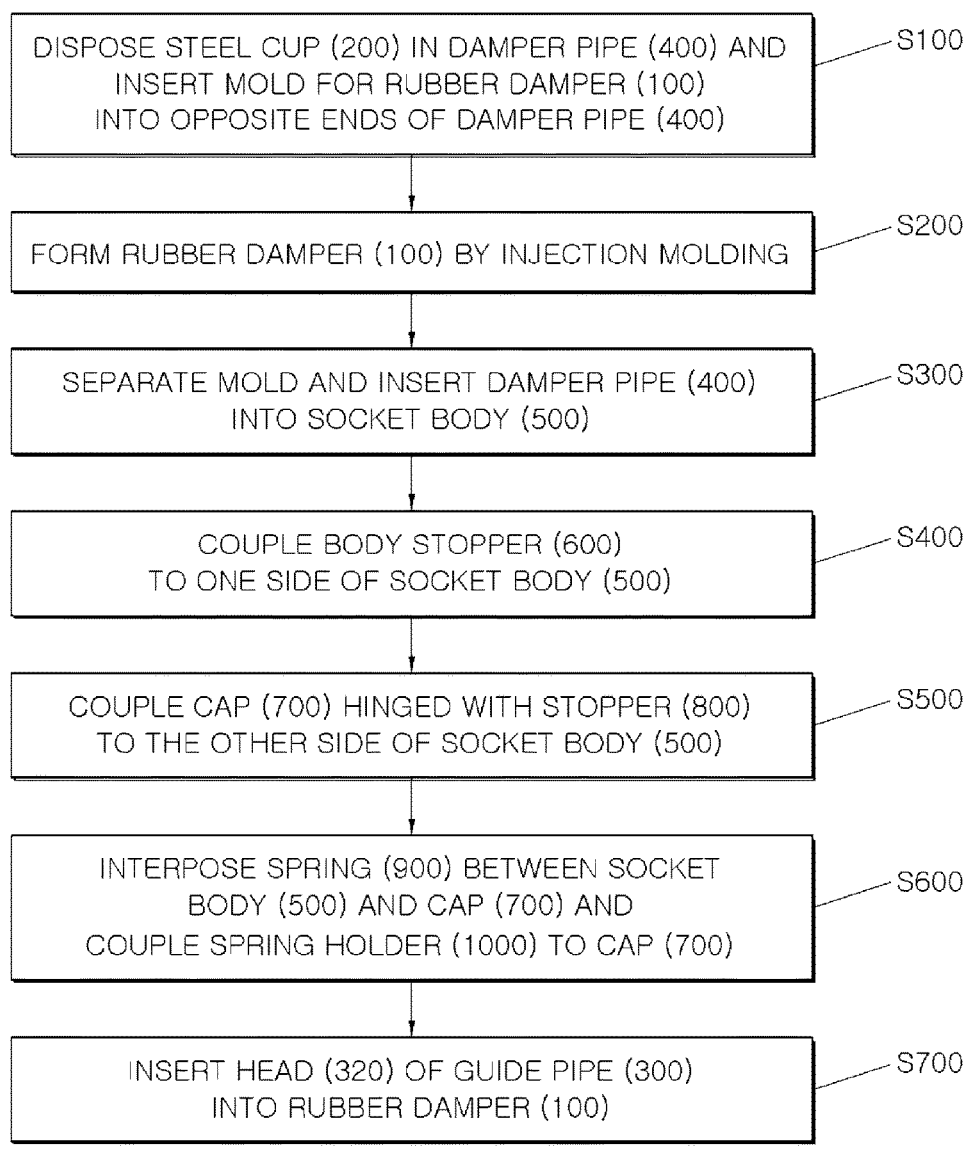
FIG. 13 is a flowchart showing a method of manufacturing the TGS cable socket including the rubber damper according to various embodiments of the present invention.

FIG. 13 is a flowchart showing a method of manufacturing the TGS cable socket including the rubber damper according to various embodiments of the present invention. Referring to FIG. 13, the method of manufacturing the TGS cable socket having the rubber damper according to the present invention includes step S100 of disposing the steel cup 200 in the damper pipe 400 and inserting the mold for the rubber damper 100 into the opposite ends of the damper pipe 400, step S200 of forming the rubber damper 100 by injection molding, step S300 of separating the mold from the damper pipe 400 and inserting the damper pipe 400 into the socket body 500, step S400 of coupling the body stopper 600 to one side of the socket body 500, step S500 of coupling the cap 700 hinged with the stopper 800 to the other side of the socket body 500, step S600 of interposing the spring 900 between the socket body 500 and the cap 700 and coupling the spring holder 1000 to the cap 700, and step S700 of inserting the head 320 of the guide pipe 300 into the rubber damper 100.

As described above, a TGS cable socket according to various embodiments of the present invention is configured without a mass damper, whereby the production cost can be reduced and the performance of manipulating a TGS lever can be enhanced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A Transmission Gear Shift (TGS) cable socket including a rubber damper configured to couple a TGS lever and an outer cable to each other so a manipulation force of the TGS lever is transmitted to a transmission through an inner cable disposed in the outer cable, the TGS cable socket including the rubber damper comprising:
    the rubber damper configured to damp vibration transmitted from the outer cable;
    a steel cup disposed coaxially with the rubber damper, the steel cup having a first end disposed in the rubber damper, and a second end protruding from the rubber damper and coupled to the outer cable; and
    a guide pipe disposed coaxially with the rubber damper, the guide pipe including a first end disposed in the rubber damper at a position spaced apart from the steel cup, and a second end protruding from the rubber damper,
    wherein the steel cup comprises:
    a cylindrical steel cup body inserted at a first end thereof into a rubber damper body; and
    a steel cup coupling part protruding from the first end of the steel cup body toward the rubber damper body and configured to fix the steel cup body to the rubber damper body,
    wherein the steel cup coupling part comprises a plurality of steel cup coupling holes formed parallel to the steel cup body.

2. The TGS cable socket including the rubber damper of claim 1, wherein the guide pipe comprises:
    a guide pipe body inserted at a first end thereof into the rubber damper body; and
    a guide pipe head protruding from the first end of the guide pipe body and inserted into the rubber damper body.

3. A Transmission Gear Shift (TGS) cable socket including a rubber damper configured to couple a TGS lever and an outer cable to each other so a manipulation force of the TGS lever is transmitted to a transmission through an inner cable disposed in the outer cable, the TGS cable socket including the rubber damper comprising:
    the rubber damper configured to damp vibration transmitted from the outer cable;
    a steel cup disposed coaxially with the rubber damper, the steel cup having a first end disposed in the rubber damper, and a second end protruding from the rubber damper and coupled to the outer cable;
    a guide pipe disposed coaxially with the rubber damper, the guide pipe including a first end disposed in the rubber damper at a position spaced apart from the steel cup, and a second end protruding from the rubber damper; and
    a damper pipe disposed such that an inner circumferential surface thereof comes into contact with an outer circumferential surface of a fixing part, the damper pipe being configured to fix the rubber damper in the TGS cable socket at a predetermined position, wherein the damper pipe comprises:
a plurality of first guide parts protruding from an outer circumferential surface of the damper pipe and extending parallel to a central axis of the damper pipe; and
a plurality of second guide parts protruding from the inner circumferential surface of the damper pipe, each of the second guide parts having a through hole formed parallel to the central axis of the damper pipe.

4. The TGS cable socket including the rubber damper of claim 3, further comprising a socket body in which the damper pipe is seated.

5. The TGS cable socket including the rubber damper of claim 4, wherein the socket body comprises:
a disc-shaped blocking member having a first surface with which a first end of the rubber damper comes into contact, and a through hole formed coaxially with the rubber damper;
a first cylindrical member formed on a first side of the blocking member and disposed coaxially with the rubber damper, the first cylindrical member having an inner circumferential surface coming into contact with an outer circumferential surface of the damper pipe; and
a second cylindrical member formed on a second side of the blocking member and disposed coaxially with the first cylindrical member.

6. The TGS cable socket including the rubber damper of claim 5, wherein the socket body further comprises:
a plurality of socket body protrusions protruding from the first surface of the blocking member into the first cylindrical member and coming into contact with a first surface of the fixing part.

7. The TGS cable socket including the rubber damper of claim 6, wherein the socket body protrusions are inserted into space between insulation protrusions, and each of the socket body protrusions has a fan-shaped cross-section.

8. The TGS cable socket including the rubber damper of claim 6, wherein the first cylindrical member comprises:
a plurality of guide grooves, formed in the inner circumferential surface of the first cylindrical member and extending parallel to a central axis of the first cylindrical member, and into which guide parts are inserted; and
a plurality of coupling parts protruding from an outer circumferential surface of the first cylindrical member.

9. The TGS cable socket including the rubber damper of claim 1, further comprising:
a body stopper, which is coupled to a first cylindrical member, and into which the rubber damper, the steel cup, a damper pipe and the first cylindrical member are inserted.

10. The TGS cable socket including the rubber damper of claim 9, wherein the body stopper comprises:
a cylindrical stopper body having an inner circumferential surface coming into contact with an outer circumferential surface of the first cylindrical member;
a body stopper side surface coming into contact with a side surface of the first cylindrical member and including a through hole, through which the steel cup body passes;
a plurality of coupling holes formed in an outer circumferential surface of the stopper body so that coupling parts are inserted into the coupling holes;
a stopper support protruding from an upper portion of the stopper body and supporting the stopper; and
a plurality of body stopper protrusions protruding from the body stopper side surface into the stopper body and coming into contact with a first surface of a fixing part.

11. The TGS cable socket including the rubber damper of claim 10, further comprising:
a cap into which a second cylindrical member is inserted, and including a first end coming into contact with a blocking member.

12. The TGS cable socket including the rubber damper of claim 11, further comprising:
a stopper having a first end hinged to an upper portion of the cap, and a second end supported by a stopper support.

13. The TGS cable socket including the rubber damper of claim 11, further comprising:
a spring disposed between the cap and the second cylindrical member and having a first end coming into contact with the blocking member.

14. The TGS cable socket including the rubber damper of claim 13, further comprising:
a spring holder disposed coaxially with the cap and inserted into the cap, the spring holder coming into contact with a second end of the spring.

15. A method of manufacturing a Transmission Gear Shift (TGS) cable socket including a rubber damper, comprising:
disposing a steel cup in a damper pipe and inserting a mold for the rubber damper into opposite ends of the damper pipe;
forming the rubber damper by injection molding;
separating the mold from the damper pipe and inserting the damper pipe into a socket body;
coupling a body stopper to a first side of the socket body;
coupling a cap hinged with the stopper to a second side of the socket body;
interposing a spring between the socket body and the cap, and coupling a spring holder to the cap; and
inserting a head of the guide pipe into the rubber damper.

* * * * *